United States Patent
Hao et al.

(10) Patent No.: US 8,816,556 B2
(45) Date of Patent: Aug. 26, 2014

(54) OPTIMIZED ELECTRIC MACHINE FOR SMART ACTUATORS

(75) Inventors: Lei Hao, Troy, MI (US); Chandra S. Namuduri, Troy, MI (US); Balarama V. Murty, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1110 days.

(21) Appl. No.: 12/409,672

(22) Filed: Mar. 24, 2009

(65) Prior Publication Data

US 2010/0244610 A1    Sep. 30, 2010

(51) Int. Cl.
| | |
|---|---|
| H02K 1/00 | (2006.01) |
| H02K 3/00 | (2006.01) |
| H02K 1/30 | (2006.01) |
| H02K 29/03 | (2006.01) |
| H02K 21/16 | (2006.01) |
| H02K 21/12 | (2006.01) |
| H02K 1/27 | (2006.01) |
| H02K 7/08 | (2006.01) |

(52) U.S. Cl.
CPC .................. H02K 21/12 (2013.01); H02K 1/30 (2013.01); H02K 1/278 (2013.01); H02K 7/083 (2013.01); H02K 29/03 (2013.01); H02K 7/08 (2013.01); H02K 21/16 (2013.01); H02K 7/088 (2013.01); H02K 1/27 (2013.01)
USPC ........................ 310/180; 310/156.01; 310/208

(58) Field of Classification Search
USPC .............................. 310/156.12, 179, 180, 208
See application file for complete search history.

(56) References Cited

U.S. PATENT DOCUMENTS

| | | | | |
|---|---|---|---|---|
| 3,418,506 A | * | 12/1968 | Parker | 310/268 |
| 5,060,959 A | * | 10/1991 | Davis et al. | 280/5.514 |
| 5,175,457 A | * | 12/1992 | Vincent | 310/15 |
| 5,220,228 A | * | 6/1993 | Sibata | 310/216.093 |
| 5,329,195 A | * | 7/1994 | Horber et al. | 310/68 B |
| 6,172,438 B1 | | 1/2001 | Sakamoto | |
| 6,727,623 B2 | | 4/2004 | Horst et al. | |

(Continued)

FOREIGN PATENT DOCUMENTS

| | | |
|---|---|---|
| CN | 101106308 A | 1/2007 |
| DE | 2903295 | 7/1980 |

OTHER PUBLICATIONS

Janjic et al , "Design of PM integrated motor-drive system for axial pumps", 2007 European Conference on Power Electronics and Applications, Sep. 2-5, 2007.*

(Continued)

Primary Examiner — John K Kim

(57) ABSTRACT

A single stator electric machine includes a plurality of magnets for generating a first magnetic field. Each respective magnet represents a respective rotor pole. A magnet holder retains the plurality of magnets. A stator is disposed radially outward from the plurality of magnets for generating a second magnetic field. The stator includes a plurality of stator poles separated by slots with each of the stator poles having a concentrated winding with a respective number of turns formed around each respective stator pole. Each respective concentrated winding within the stator comprises non-overlapping phases which increase an active length of the windings of the stator and reduce an overhang of each respective winding with respect to each stator pole for improving torque efficiency. A number of rotor poles is at least eight and the number of rotor poles and a number of stator slots have a least common multiple of at least 36.

1 Claim, 6 Drawing Sheets

(56) References Cited

U.S. PATENT DOCUMENTS

| | | | |
|---|---|---|---|
| 6,844,647 B2* | 1/2005 | Horber | 310/156.43 |
| 2004/0041485 A1* | 3/2004 | Horber | 310/156.43 |
| 2005/0248107 A1* | 11/2005 | Roos et al. | 280/43.23 |
| 2005/0258702 A1* | 11/2005 | Michaels | 310/179 |
| 2005/0269895 A1* | 12/2005 | Innami et al. | 310/218 |
| 2006/0006749 A1* | 1/2006 | Sasaki et al. | 310/68 R |
| 2006/0012262 A1* | 1/2006 | Baba et al. | 310/217 |
| 2006/0243503 A1* | 11/2006 | Carlson | 180/65.3 |
| 2006/0273684 A1* | 12/2006 | Ishikawa et al. | 310/216 |
| 2007/0063595 A1* | 3/2007 | Habibi et al. | 310/67 A |
| 2007/0132324 A1* | 6/2007 | Coupart | 310/67 R |
| 2007/0222330 A1* | 9/2007 | Innami et al. | 310/259 |
| 2010/0244610 A1* | 9/2010 | Hao et al. | 310/179 |

OTHER PUBLICATIONS

Still et al, "Elements of Electrical machine Design", McGraw Hill, 1954, p. 171.*
Definition of 'Stator', www.dictionary.com.*
Wikipedia, 'winding pitch', WWW.wikipedia.com.*
Kirtley, Electric Machinery., Massachusetts Institute of Technology, 2005.*
Fitzgerald et al, 'Electric Machinery', McGraw Hill, 1990.*
Hendershot et al, "Design of Brushless Permanent Magnet Motors", Magna Physics, 1994.*

\* cited by examiner

PHASE A
Start in Slot 1

PHASE B
Start in Slot 4

PHASE C
Start in Slot 5

| Slot \ Pole | 2 | 4 | 6 | 8 | 10 | 12 | 14 | 16 |
|---|---|---|---|---|---|---|---|---|
| 3 | 6 | 12 | | | | | | |
| 6 | | 12 | | 24 | 30 | | | |
| 9 | | 36 | 18 | 72/.945# | 90/.945# | 36 | 126/.473 | 144/.175 |
| 12 | | | | 24 | 60/.933* | | 84/.933* | 48 |
| 15 | | | 30 | 120/.621 | 30 | 60/.906# | 210/.951# | 240/.951# |
| 18 | | | | 72 | 90/.647 | 36.866 | 126/.902* | 144/.931* |
| 21 | | | | 168/.468 | 210/.565 | 84 | 42 | 336/.851 |
| 24 | | | | | 120/463 | | 168/.760 | 48 |

OPTIMIZED ELECTRIC MACHINE FOR SMART ACTUATORS

BACKGROUND OF INVENTION

An embodiment relates generally to dual stator electric machines.

Electric machines are typically designed to achieve a specific operating characteristic. For example, electric machines with drag cup rotors have very low inertia properties. Induction machines typically exhibit torque ripple free properties, whereas conventional permanent magnet synchronous machines exhibit high torque to ampere ratios. However, achieving a respective specific operating characteristic typically results in the sacrifice of other operating characteristics. While each of the above examples achieves one of the desired operating characteristics, this is often done at the expense of not obtaining one of the other respective desired operating characteristics. That is, none of the devices described above are capable of exhibiting all of the desired operating characteristics in a single electric machine.

SUMMARY OF INVENTION

An advantage of an embodiment of the invention is an electric machine that provides optimal operating characteristics such as a high torque to ampere ratio, a high torque to inertia ratio, and low torque ripple in the same machine.

A single stator electric machine includes a plurality of magnets for generating a first magnetic field. Each respective magnet represents a respective rotor pole. A magnet holder retains the plurality of magnets. The magnet holder has a circular configuration with the plurality of magnets being positioned around the circular configuration of the magnet holder. A stator is disposed radially outward from the plurality of magnets for generating a second magnetic field. The magnet and the stator have a first air gap formed therebetween. The stator includes a plurality of stator poles separated by slots with each of the stator poles having a concentrated winding with a respective number of turns formed around each respective stator pole. Each respective concentrated winding within the stator comprises non-overlapping phases. The concentrated windings increase an active length of the windings of the stator and reduce an overhang of each respective winding with respect to each stator pole for improving torque density and machine efficiency. The number of rotor poles is at least eight. The number of rotor poles and the number of stator slots have a least common multiple of at least 36.

DETAILED DESCRIPTION

Figure 1:
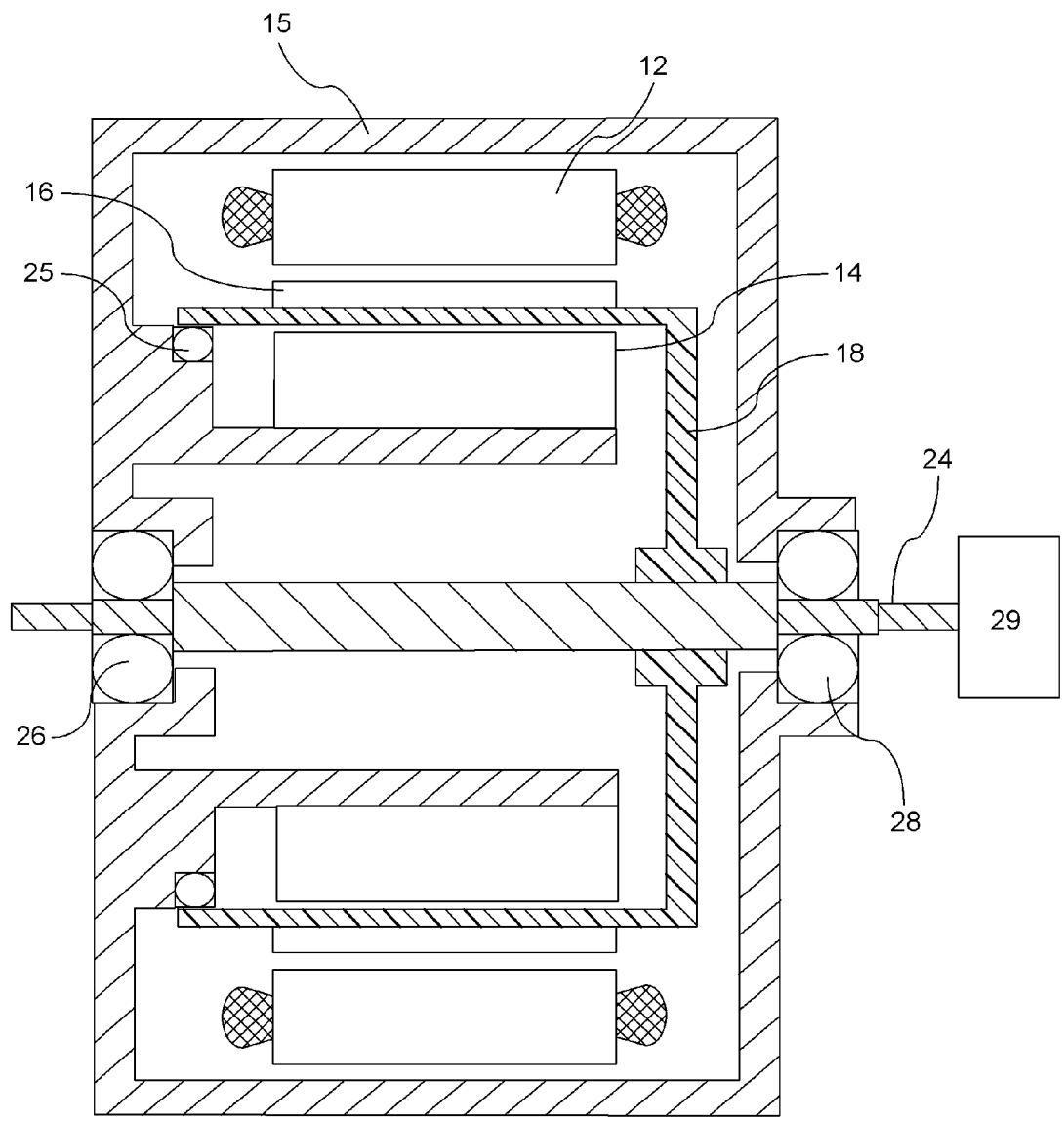
FIG. 1 is a cross section view of an electric machine along a diametric plane according to a first embodiment of the invention.
Figure 2:
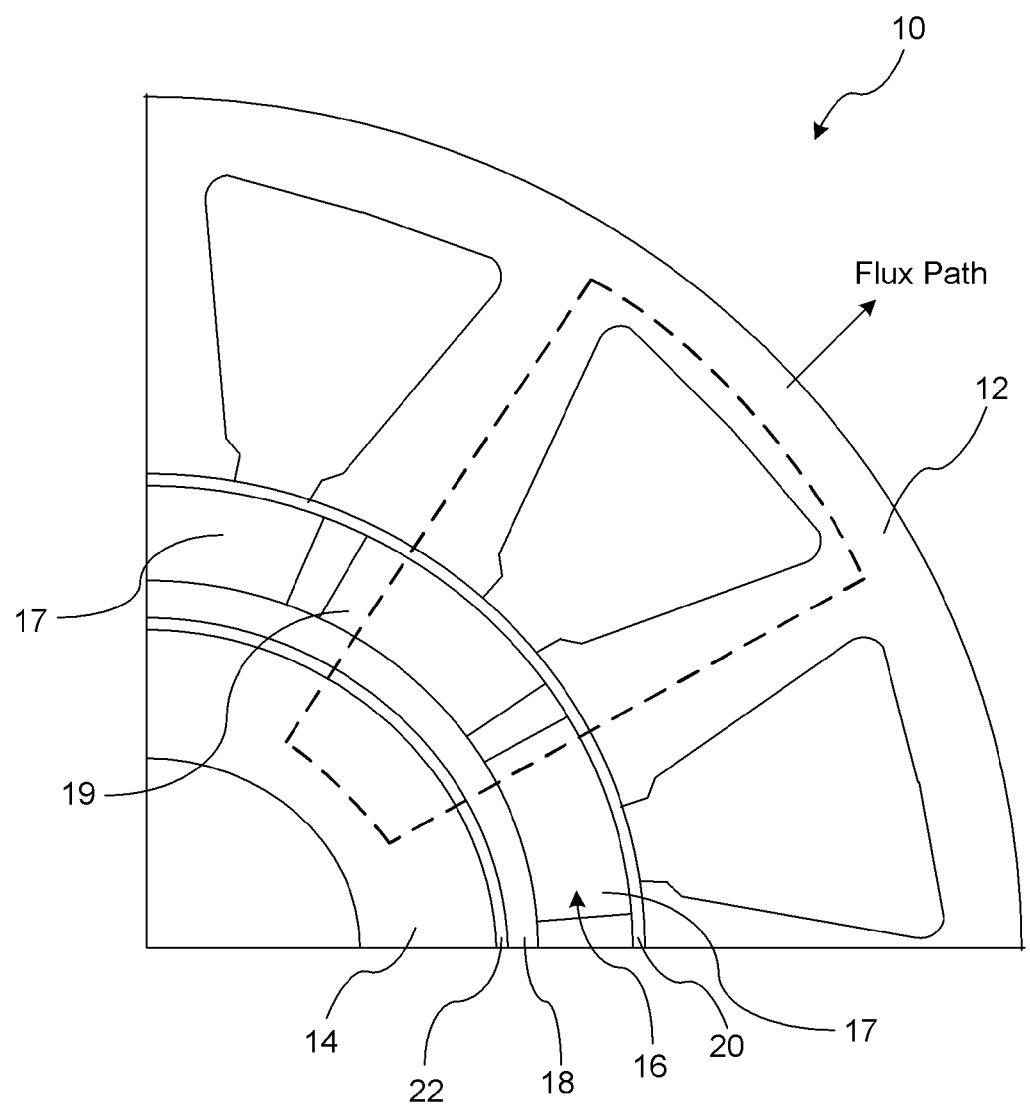
FIG. 2 is a cross section view of the electric machine along a transverse plane according to a first embodiment of the invention.

Referring to both FIGS. 1 and 2 there is shown cross-section views of an electric machine 10 along an axial diametric plane and a transverse plane, respectively. The electric machine 10 as described herein is used for devices and systems that require high torque and fast response times such as semi-active or active suspension systems, electric power steering systems, electromechanical braking systems or like systems. The electric machine 10 is a single stator electric machine having a stator 12 and an inner core 14 fixed within a machine housing 15. The first stator 12 and the inner core 14 are coaxial to one another within the machine housing 15, and have different diameters. The first stator 12 has concentrated windings. Concentrated windings are non-overlapping windings which will be described in detail later.

Figure 3:
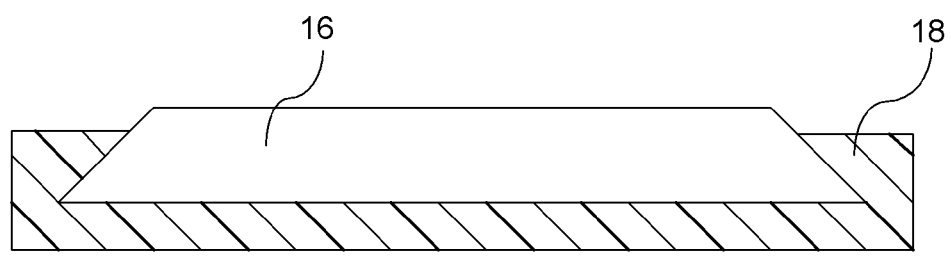
FIG. 3 is a cross section view of a magnetic holder and magnet according to a first embodiment of the invention.
Figure 4:
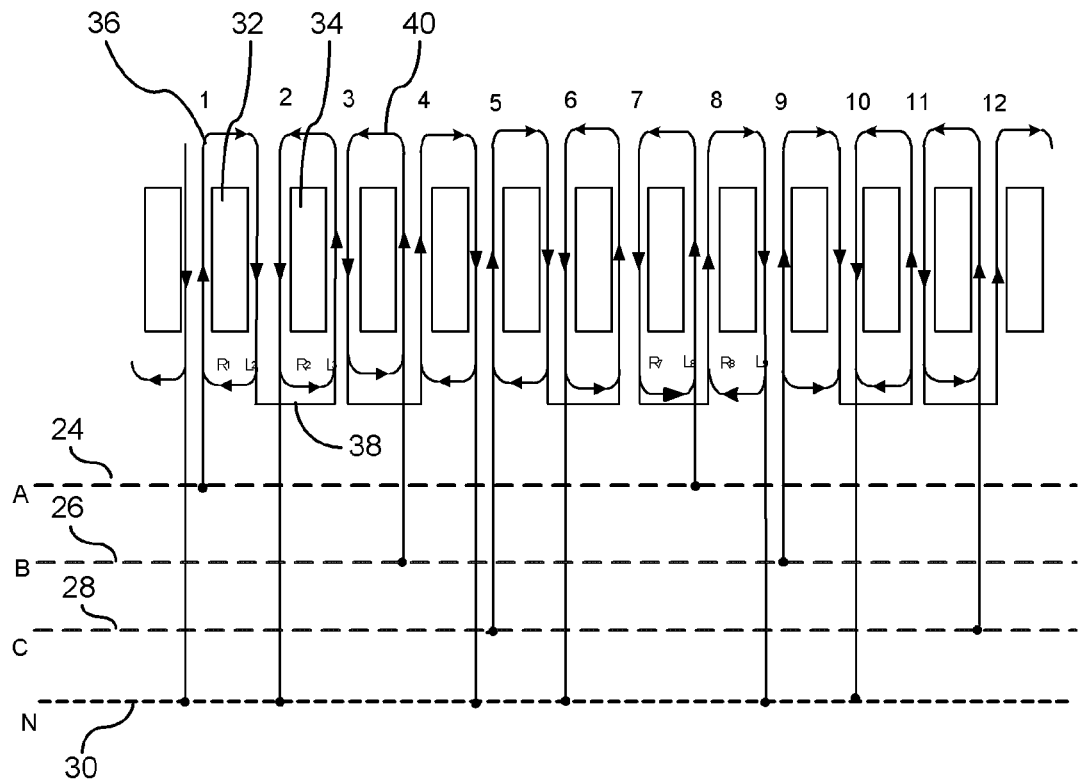
FIG. 4 is an electrical schematic of a concentrated winding configuration for a 3-phase electric machine.
Figure 5:
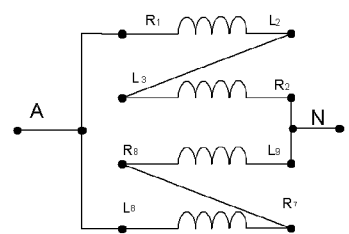
FIG. 5 is an electrical schematic of a concentrated winding configuration for a first phase of the electric machine.
Figure 6:
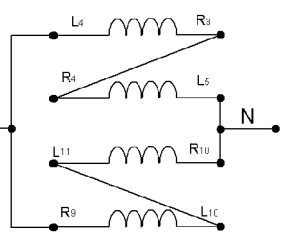
FIG. 6 is an electrical schematic of a concentrated winding configuration for a second phase of the electric machine.
Figure 7:
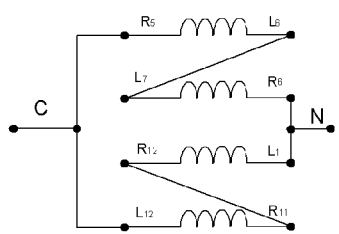
FIG. 7 is an electrical schematic of a concentrated winding configuration for a third phase of the electric machine.

A plurality of magnets 16 is radially disposed between the stator 12 and inner core 14. The plurality of magnets 16 are retained by a magnet holder 18 in a cylindrical configuration that are rotatable in a space created between the stator 12 and the inner core 14. The plurality of magnets is configured so that each of the magnets having a first polarity alternate with each of the magnets having a second polarity. As a result, each respective magnet having a first polarity is juxtaposed to a magnet having a second polarity. The south pole magnets are designated generally by 17, whereas north pole magnets are designated generally be 19. A cross section view of the magnet holder 18 and a respective magnet is shown generally in FIG. 3. It should be understood the magnet holder is only one configuration and is not limited to the magnet holder as illustrated.

The stator 12 is disposed radially outward from the plurality of magnets 16 by a respective distance thereby forming a first air gap 20 therebetween. The inner core 14 is disposed radially inward from the magnet holder 18 by a respective distance thereby forming a second air gap 22 therebetween. The stator 12 in cooperation with the inner core 14 and plurality of magnets 16 generate a flux path, as shown, for creating an electromagnetic field which is converted into mechanical energy in the form of a torque.

The magnet holder 18 is coupled to a shaft 24 at a first end of the magnet holder 18. The magnet holder 18 is supported by a bearing surface 25 at a second end of the magnet holder 18. The shaft 24 extends axially through the electric machine 10 and is co-axial to the plurality of magnets 16. A first bearing 26 and a second bearing 28 supports the shaft 24 as it extends through the machine housing 15. The shaft 24 extends through apertures in the machine housing 15 and is configured for coupling to a respective component 29 exterior of the electric machine 10 for applying torque to the respective component 29. The component may include an actuator for the active suspension system, electric steering system, electric braking system or like system. The magnet holder 18 is preferably made from non-magnetic stainless steel. Alternatively, the magnet holder 18 may be produced from other non-magnetic materials which provide adequate strength for transmitting mechanical torque to the respective vehicle system. The magnetic holder 18 in cooperation with the bearing surface 25 and the coupling to shaft 24 which is supported by bearings 26 and 28 maintain a spatial relationship between the stator 12 and the inner core 14. The respective bearings allow the magnet holder 18 and plurality of magnets 16 to rotate in the space formed radially between the stator 12 and the inner core 14.

The electric machine 10 as shown in FIG. 1 eliminates the conventional rotor and integrally formed rotor shaft typically used in conventional electric motors such as permanent magnet electric machines. The inner core 14 in cooperation with the second air gap 22 functions as the rotor core for providing the magnetic flux path that would otherwise be provided by the rotor core in a standard permanent magnet motor. The elimination of the conventional rotor core and integral formed shaft reduces the overall weight of the rotary part of electric machine thereby reducing the inertia of the electric machine 10. At the same time, the inner core provides the magnetic flux path such that a high torque is generated.

As discussed earlier, the stator 12 has non-overlapping concentrated windings. FIGS. 4-7 show winding configurations illustrating the concentrated winding. It should be understood that the winding concentrated winding configuration is for exemplary purposes and that any configuration of concentrated windings may be used herein. The electric motor 10 is a three phase motor having a first phase (A), a second phase (B), and a third phase (C).

Figures 8, 9:
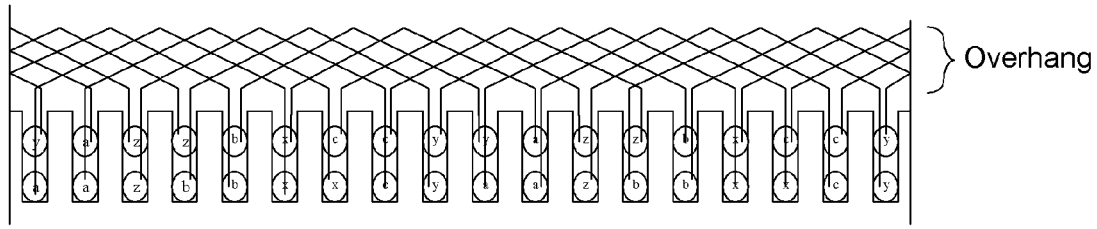
FIG. 8 is an electrical schematic of a winding configuration for a prior art conventional overlapping winding.
FIG. 9 is a table illustrating optimized rotor pole to stator slot combinations.

A respective pair of successively wound stator poles is represented by stator pole 32 and stator pole 34 illustrates concentrated winding configurations. Windings around stator poles 32 and 34 are electrically coupled to phase A. A first winding 36 is formed around stator pole 32 in a concentrated configuration, which includes continuously wrapping stator pole 32 with a predetermined number of turns before an exit wire 38 exits the stator pole 32 and continues uninterrupted to the next stator pole 34. At stator pole 34, a second winding 40 is formed by continuously winding stator pole 34 with the predetermined number of turns. The second winding 40 thereafter electrically couples to a neutral point 30. A next successive pair of stator poles is electrically coupled to phase B using the concentrated winding configuration. Similarly, the next successive pair of stator poles is electrically coupled to phase C using the concentrated winding configuration. The winding pattern is repeated for each of the remaining successive pair of stator poles of the respective stator. In contrast, a conventional lapping winding configuration includes winding a respective pole using only a single turn before proceeding to a next pole. The winding of the conventional lapping configuration is continued in succession thereby ultimately returning to each previously wound pole to add additional turns around the stator pole. As a result, the number of exit wires that electrically connect the successive stator poles will be equal to the number of turns formed on each stator pole. The plurality of exit wires between successive poles lap one another thereby creating an overhang extending radially outward from the respective stator as illustrated in FIG. 8. In the preferred embodiment, shown in FIG. 4, only a single exit wire electrically connects a respective pair of stator poles. The single non-overlapping exit wire results in a significantly reduced overhang in comparison to the conventional lap winding configuration. The reduction in the overhang results in an increase in the active length of the stator within package size for increasing the torque density. That is, in the concentrated winding configuration, the majority of the overall winding is formed as part of the turns as opposed to the exit wires coupling the respective turns, thereby concentrating the length of the entire winding to each of the respective stator poles. This results in reducing the stator copper loss and improving efficiency of the electrical machine. For same package size, the reduced length of end turns results in longer active stator length thereby achieving a high torque to ampere ratio or high power density for the same operating range. Due to the improved efficiency, the increased machine power density does not affect its thermal performance.

In utilizing the electric machine with concentrated windings, an increased number of rotor poles (i.e., magnets) in comparison to a conventional rotor may be preferably used. Increasing the number of poles allows the thickness of the stator core to be reduced. Reduction of the stator core thickness, results in an overall weight reduction of the electrical machine. Moreover, the increase in the number of poles in the electrical machine also generates sinusoidal back emf which provides an advantage of reducing torque ripple.

It should be understood that a respective pole/slot combination may be selected for optimizing the torque output of the electric machine in addition to decreasing the current draw and torque ripple. FIG. 9 illustrates a table identifying a rotor pole (i.e., magnets) to stator slot combination. The table identifies a least common multiple (LCM) for the rotor pole and stator slot combination, and in addition, a winding factor is shown in certain combinations. The LCM is the smallest whole number that is divisible by each of the rotor pole and stator slot numbers. The higher the LCM, the lower torque ripple that is generated. Preferably, a rotor pole number of greater than 8 is selected and rotor pole and slot combination having a LCM of at least 36 is selected.

The winding factor is defined by the ratio of flux linked by an actual winding to flux that would have been linked by a full pitch concentrated winding with the same number of turns. The higher the winding factor value, the higher the torque density. Preferably, a winding factor of greater than 0.7 is selected.

When selecting a combination which affords the advantages described herein, a combination offering the highest LCM and the highest winding factor should be selected. However, selecting the combination with the highest LCM and winding factor has drawbacks. For example, those combinations having an odd number of stator slots can induce unbalanced magnetic pull which results in vibration. Combinations that are acceptable selections are those identified with an asterisk notation. Those combinations having a high LCM values and winding factors but are susceptible to vibration are those with an odd number of slots and are represented with a # notation.

Figure 10:
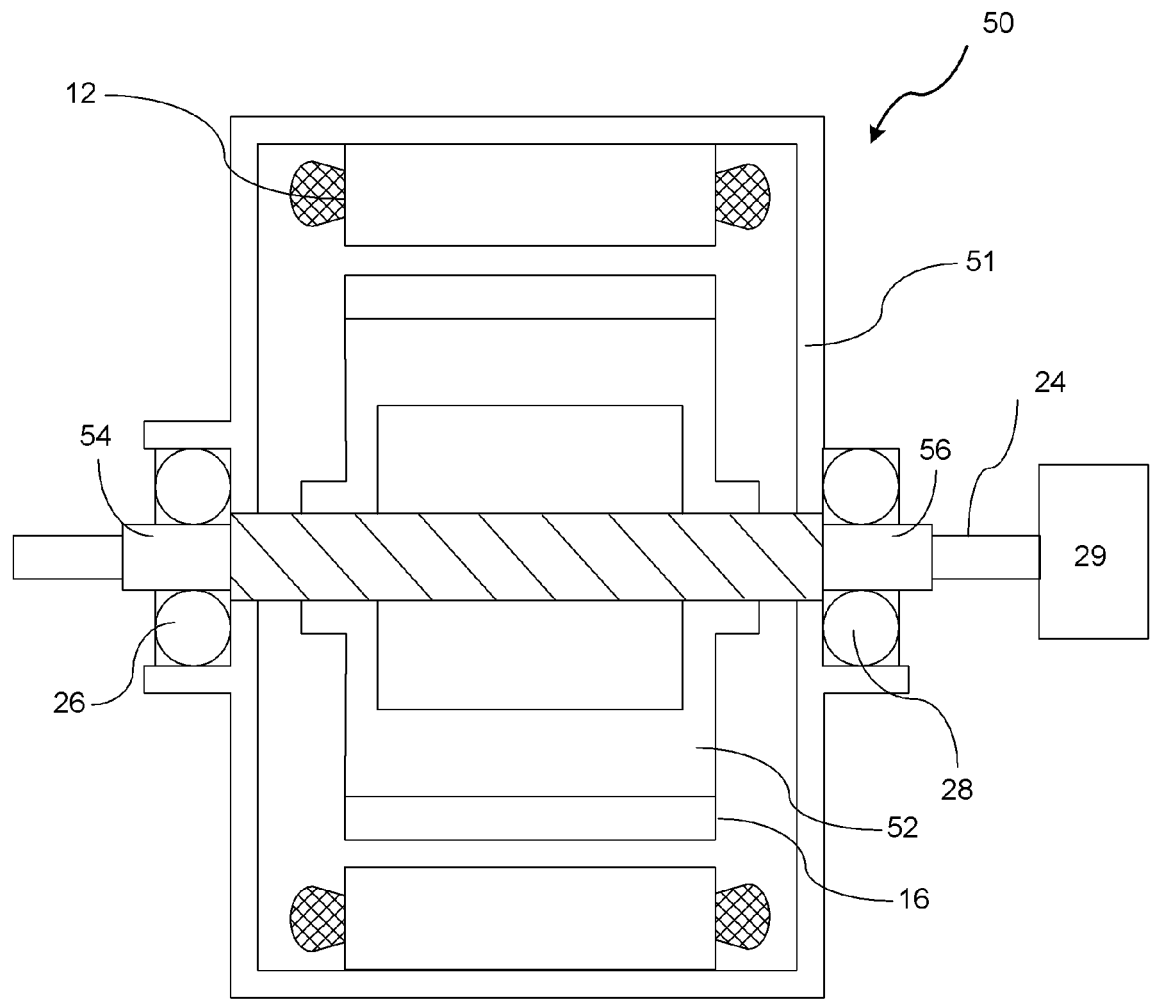
FIG. 10 is a cross section view of an electric machine along a diametric plane according to a second embodiment of the invention.
Figure 11:
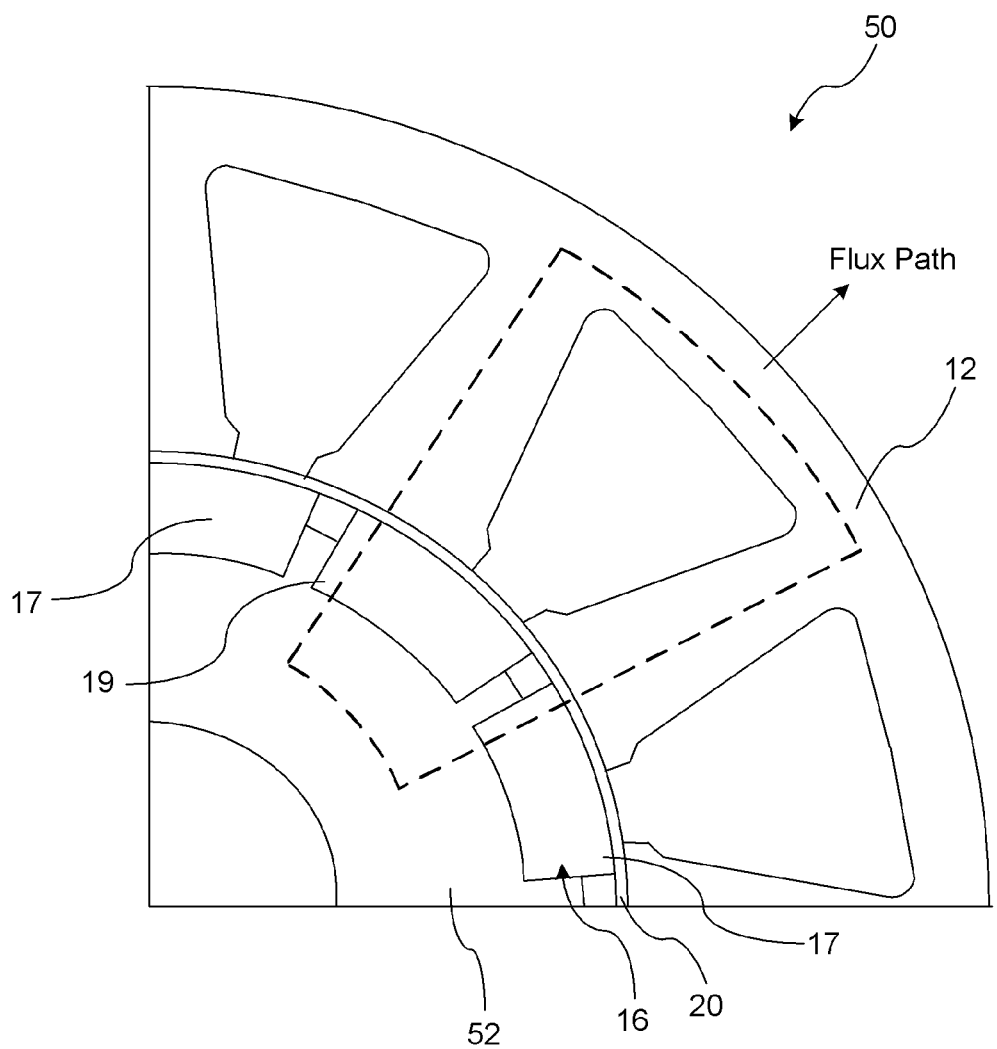
FIG. 11 is a cross section view of the electric machine along a transverse plane according to a second embodiment of the invention.

Referring to both FIGS. 10 and 11 there is shown a cross-section section views of an electric machine 50 of a second embodiment along an axial plane and a transverse plane, respectively. Like reference numerals will be used to for similar components. The electric machine 50 is a single stator electric machine having a stator 12 fixed within in a machine housing 51. The stator 12 has concentrated windings as described earlier.

Figure 12:
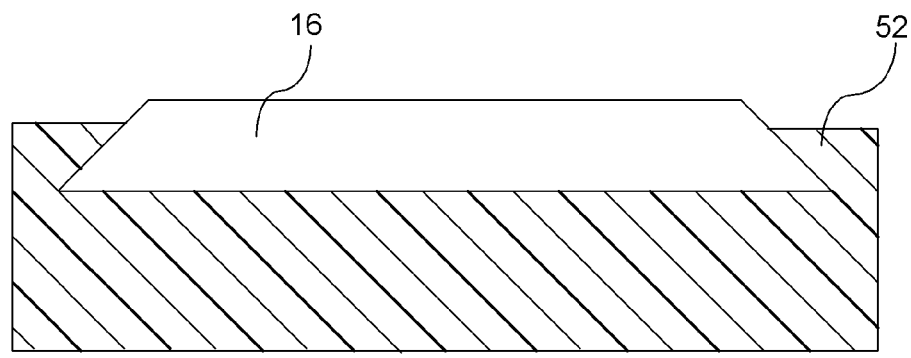
FIG. 12 is a cross section view of a magnetic holder and magnet according to a second embodiment of the invention.

The plurality of magnets 16 are retained by a magnetic magnet holder 52 in a cylindrical configuration that are rotatable in a space disposed radially inward from the stator 12. A cross section view of the magnetic magnet holder 52 and a respective magnet is shown generally in FIG. 12. The stator 12 is disposed radially outward from the plurality of magnets 16 by a respective distance thereby forming the air gap 20 therebetween. The magnetic magnet holder 52 is coupled to the shaft 24 at a first end 54 of the magnetic magnet holder 18 and at the second end 56 of the magnetic magnet holder 52. The shaft 24 extends axially through the electric machine 10 and is co-axial to the plurality of magnets 16. The first bearing 26 and a second bearing 28 support the shaft 24 as it extends through the machine housing 15. The shaft extends through apertures in the machine housing 52 and is configured for coupling to a respective component 29 exterior of the electric machine 10 for applying torque to the respective component 29. The magnetic magnet holder 18 is preferably made from magnetic material such as electrical steel or like material. The magnetic magnet holder 52 as supported by the shaft 24 maintains a spatial relationship to the stator 12. The magnetic magnet holder 52 and plurality of magnets 16 to rotate in the space formed radially inward from the first stator 12 for providing torque to the respective components 29.

The magnetic magnet holder 52 must has a greater radial thickness in comparison to the non-magnetic magnet holder since the magnetic magnet holder 52 functions as the inner core for completing the flux path. The stator 12 in cooperation with the magnetic magnet holder 52 and plurality of magnets 16 generate the flux path, as shown, for creating an electromagnetic field which is converted into mechanical energy in the form of a torque. It should be understood that the concentrated winding and rotor to pole selection as described in FIGS. 4-7, and 9 are used in cooperation with the electric machine 50 as described herein.

While certain embodiments of the present invention have been described in detail, those familiar with the art to which this invention relates will recognize various alternative designs and embodiments for practicing the invention as defined by the following claims.

What is claimed is:

1. A single stator electric machine comprising:
a plurality of magnets for generating a first magnetic field, each respective magnet represents a respective rotor pole;
a magnet holder for retaining the plurality of magnets, the magnet holder having a circular configuration with the plurality of magnets being positioned around the circular configuration of the magnet holder; and
a stator disposed radially outward from the plurality of magnets for generating a second magnetic field, the magnet and the stator having a first air gap formed therebetween, the stator including a plurality of stator poles separated by slots with each of the stator poles having a concentrated winding with a respective number of turns formed around each respective stator pole, each respective concentrated winding within the stator comprising non-overlapping phases, the concentrated windings increase an active length of the windings of the stator and reduce an overhang of each respective winding with respect to each stator pole for improving torque density and machine efficiency, the concentrated windings including a winding factor of greater than 0.7;
wherein the number of rotor poles is at least eight, and wherein the number of rotor poles and a number of stator slots have a least common multiple of at least 36.

* * * * *